United States Patent [19]

Yamamoto et al.

[11] 4,289,856
[45] Sep. 15, 1981

[54] PROCESS FOR PREPARING NON-YELLOWING INTEGRAL-SKINNED POLYURETHANE FOAM USING A POLYOL HAVING A FUNCTIONALITY OF 4 TO 8

[75] Inventors: Masaki Yamamoto; Ichiro Azuma, both of Kakogawa, Japan

[73] Assignee: The Toyo Rubber Industry Co., Ltd., Osaka, Japan

[21] Appl. No.: 94,265

[22] Filed: Nov. 14, 1979

[30] Foreign Application Priority Data

Nov. 14, 1978 [JP] Japan .............................. 53-140577

[51] Int. Cl.$^3$ ............................................. C08G 18/14
[52] U.S. Cl. ...................... 521/51; 521/107; 521/113; 521/117; 521/121; 521/124; 521/127; 521/128; 521/129; 521/167; 521/172; 521/173; 521/174; 521/176
[58] Field of Search ............... 521/107, 113, 117, 121, 521/124, 127, 128, 129, 167, 172, 173, 174, 176, 51

[56] References Cited

U.S. PATENT DOCUMENTS

| | | | |
|---|---|---|---|
| 4,021,385 | 5/1977 | Austin et al. | 521/117 |
| 4,065,410 | 12/1977 | Schäfer et al. | 521/51 |
| 4,107,102 | 8/1978 | Dahm et al. | 521/51 |
| 4,150,206 | 4/1979 | Jourquin et al. | 521/124 |

*Primary Examiner*—Maurice J. Welsh
*Attorney, Agent, or Firm*—Sughrue, Mion, Zinn, Macpeak and Seas

[57] ABSTRACT

A process for preparing an integral-skinned polyurethane foam wherein a foamable composition for formation of polyurethane which comprises a polyol, polyisocyanate, cross-linking agent, catalyst, and blowing agent is reacted and expanded in a mold, characterized in that (a) said polyol is a polyether polyol having a terminal ethylene oxide adduct rate of at least 60%, an OH number of 20 to 100 and a functionality of 4 to 8, or a polyester polyol having a functionality of 4 to 8;
(b) said polyisocyanate is a non-aromatic polyisocyanate having an isocyanate index of 90 to 130;
(c) said cross-linking agent is diethanolamine and ranges from 0.5 to 20 parts by weight based on 100 parts by weight of said polyol;
(d) said catalyst is an organometallic salt; and
(e) said blowing agent is a halogenated hydrocarbon of a low boiling point.

5 Claims, No Drawings

PROCESS FOR PREPARING NON-YELLOWING INTEGRAL-SKINNED POLYURETHANE FOAM USING A POLYOL HAVING A FUNCTIONALITY OF 4 TO 8

BACKGROUND OF THE INVENTION

1. Field of the Invention

This invention relates to a process for preparing a non-yellowing integral-skinned polyurethane foam.

2. Description of the Prior Art

The molded products of integral-skinned polyurethane foam whose core is microcellular and whose external surface is formed integrally with a beautiful skin find their major use in the furniture, automobile assembly, imitation industrial articles, shoes and the like. Conventional integral-skinned polyurethane foam products are yellowed under the influence of light and heat, so that they have been used by coloration to a dark or deep color such as black color in order that the yellowing may not be perceived in appearance. For this reason, kind of color applicable to the products has been limited.

The yellowing of polyurethane foam is ascribable to the use of aromatic polyisocyanates as an ingredient of the polyurethane foam reaction composition. Accordingly, there has been proposed a method for preparing an integral-skinned polyurethane foam by substituting aliphatic or alicyclic polyisocyanates for the aromatic polyisocyanates to prevent it from yellowing (cf. U.S. Pat. No. 4,150,206).

The integral-skinned polyurethane foam thus obtained according to the proposed method, as described with xenon test results, does not yellow and exhibits good weathering resistance in a comparatively low temperature condition of about 45° C., but has drawbacks in further higher temperature conditions that it exhibits a low weathering resistance at above 60° C. and a low heat resistance at above 100° C. The reason why the molded product of the polyurethane foam prepared according to the proposed method is diminished in heat resistance and weathering resistance at higher temperatures is considered to be due to the fact that in the reaction composition for forming polyurethane, a polyether polyol having a functionality of not more than 3 is used as a polyol component and a combination of at least two kinds of amines, organic lead compounds and alkaline metal salts or alkaline earth metal salts is used as a catalyst.

SUMMARY OF THE INVENTION

This invention therefore lies in improvement over the foregoing method of preparing integral-skinned polyurethane foam made of non-aromatic polyisocyanates. That is, the invention has an object of providing a method for preparing an integral-skinned polyurethane foam of the nonaromatic type which is performed with the same level of reactivity as the reactivity of the case where an aromatic polyisocyanate is employed and thus results in the formation of the foam product having a satisfactory weathering resistance at higher temperatures above 60° C. and a good heat resistance at above 100° C. The above object of the present invention has been achieved using (a) a polyol, (b) a polyisocyanate, (c) a cross-linking agent, (d) a catalyst and (e) a blowing agent.

DETAILED DESCRIPTION OF THE INVENTION

In accordance with this invention, the polyisocyanate component (b) to be used is non-aromatic, and includes aliphatic and alicyclic polyisocyanates. Preferred examples of such aliphatic polyisocyanates are hexamethylene diisocyanate, 2,2,4-trimethylhexamethylene diisocyanate and the like. Amongst the alicyclic polyisocyanates, it is preferred to use 3-isocyanate-methyl-3,5,5-trimethylcyclohexyl isocyanate, 4,4'-methylene-bis(cyclohexyl isocyanate) and the like.

The NCO index of the polyisocyanates enumerated above varies between 90 and 130, preferably between 100 and 120.

The foregoing non-aromatic polyisocyanates are of a low reactivity, so that the cycle time of preparation is prolonged and the energetic reaction balance, namely balance between gasification and gelation cannot be adjusted. In order to adjust this energetic reaction balance and thereby to obtain a final product having valuable heat resistance and weathering resistance, according to this invention, the ingredients of a reaction composition, i.e., polyol component, cross-linking agent, catalyst, etc., must be selected and specified.

The polyol component (a) used in this invention includes polyether polyols and polyester polyols, preferably polyether polyols.

Said polyether polyols have a terminal ethylene oxide adduct rate of 60% or more, an OH number of 20 to 100, preferably 30 to 50 and an average functionality of 4 to 8.

If the terminal ethylene oxide adduct rate is less than 60%, the reactivity of the polyol to the aliphatic or alicyclic polyisocyanate is not enhanced, which results in lengthening the cycle time of a betchwise process of the manufacture. Moreover, the integral-skinned polyurethane foam thus obtained has not a dense skin because its green strength is not enhanced, and is diminished in heat resistance because at the terminals of the polyether polyols the amount of primary alcohol is decreased, but the amount of secondary alcohol is increased instead. Consequently, the object of this invention cannot be achieved.

On the average other hand, if the functionality of the polyether polyol is less than 4, such a polyurethane product that has good weathering resistance and heat resistance at high temperatures cannot be prepared.

The reason why the OH number of the polyether polyol is limited to 20 to 100 is to increase the content of hard segments in the resulting polyurethane molecules in order to enlarge the hard block (high melting block) of a high polymer, and as a result, to improve on heat resistance and weathering resistance. The preferred range of the OH number is 30 to 50.

As said polyester polyols, those may be selected and used which have an average functionality of 4 to 8 and a high reactivity with the polyisocyanate component as is the case with the polyether polyols.

Cross-linking agents (chain-extenders) which are usually used in the reaction for polyurethane formation are low molecular weight polyhydroxyl alcohols or amines. According to this invention, diethanolamine that has one NH group and two OH groups is selectively used as a crosslinking agent (c). It has been found empirically that diethanolamine is capable of adjusting the balance between gasification and gelation in contrast with the conventionally used tertiary amines.

The amount of diethanolamine to be compounded for the foamable composition is in the range of 0.5 to 20 parts by weight, preferably 4 to 12 parts by weight to 100 parts by weight of said polyol (a).

If the compounding amount of diethanolamine is in excess of 20 parts by weight, a rigid polyurethane constituted of too large content of hard segments is produced without forming a semi-rigid polyurethane.

Conversely, if the compounding amount of diethanolamine is less than 0.5 part by weight, mechanical properties such as strength of the final product are deteriorated.

The diethanolamine used as a cross-linking agent for this invention has been hitherto used as a catalyst for a polyurethane formation reaction. Such diethanolamine that is present in the polyurethane product without taking part in the reaction leading to the formation of it serves to promote the degradation of the polyurethane due to light and heat. According to this invention, however, the diethanolamine cross-linking agent participates in the polyurethane formation reaction with the amino group thereof being converted into urea group, so that the use of it does not affect adversely yellowing due to degradation of the polyurethane.

A catalyst (d) to be used in this invention is organometallic compounds, amongst which preferred are lead compounds such as lead naphthenate, lead acetate; and tin compounds such as tin octylate, dibutyltindilaurate. Said organometallic compounds may be used alone or in combination.

It might be mentioned that the use of amines as a catalyst is precluded from the scope of this invention as described above.

As a blowing agent (e) for foaming a polyurethane there may be used halogenated hydrocarbons of a low boiling point. Preferred ones are exemplified by trichloromonofluoromethane, methylene chloride, trichlene and the like.

Heretofore, there has been performed a process for expanding polyurethane in which water is incorporated in a reaction composition for polyurethane formation in order that the water may act as a cross-linking agent and cause the resulting polyurethane to expand by its gasification.

In this invention, the incorporation of water deteriorates on the contrary heat resistance of the polyurethane too markedly to attain the object of this invention. It is accordingly desired that even a slight amount of water contained in the starting materials be eliminated as far as possible.

In addition to the ingredients described above, anti-yellowing agent (f) is further used, which allows to ensure an additional improvement in weathering resistance and heat resistance of the resulting polyurethane foam.

Various kinds of antioxidants or UV absorbers have conventionally been used to enhance weathering resistance and heat resistance of synthetic resins.

In accordance with this invention, it is essential and desired to use as an anti-yellowing agent (f) a combination of the four groups of additives which follow. That is, antioxidant ($f_1$), assistant antioxidant ($f_2$), UV absorber ($f_3$) and UV stabilizer ($f_4$) are combined and used as antiyellowing agent (f).

The antioxidant ($f_1$) includes hindered phenols which are commercially available under trade names, for example, "BHT", "Irganox 1010", "Irganox 1076" (Ciba-Geigy Company), "Yoshinox BB", "Yoshinox GSY-930" (Yoshitomi Pharmaceutical Company).

Examples of said assistant antioxidant ($f_2$) are phosphites such as triphenyl phosphite, trioctadecyl phosphite, tridecyl phosphite; and thioethers such as dilauryl thiodipropionate, distearyl thiodipropionate.

As the UV absorber ($f_3$), there may be exemplified benzotriazoles, for example, ones having trade names of "Tinuvin P", "Tinuvin 327", "Tinuvin 328" (Ciba-Geigy Company); and benzophenones such as commercial product "Tomisorb 800" (Yoshitomi Pharmaceutical Company).

Further, said UV stabilizer ($f_4$) includes hindered amines such as commercial products, "Sanol LS 770", "Sanol LS 744", "Tinuvin 144" (Ciba-Geigy); and commercial products, "Tinuvin 120", "Irgastab 2002" (Ciba-Geigy), etc.

Finally, the foamable composition may further comprise surface active agent, filler, pigment and the like as usually used in conventional polyurethane foams.

The foamable composition for formation of polyurethane which is compounded with the ingredients thus far described is poured into a mold at ordinary temperatures or heated up to 80° C., in which the composition is reacted, foamed and then cured according to conventional procedure.

The invention will be further illustrated by the following non-limitative examples.

EXAMPLE 1

The ingredients in the formulation mentioned below were mixed and stirred thoroughly by means of homo-mixer and then poured into a predetermined mold, where they were reacted and expanded at 50° C. for 10 minutes. The resulting foamed product was allowed to stand for 48 hours at room temperature to be cured and resulted in the formation of an integral-skinned polyurethane foam.

| Formulation | parts by weight |
| --- | --- |
| 6 Functionality polyether polyol | 100 |
| Isophorone diisocyanate | 31.9 |
| Diethanolamine | 7 |
| Lead naphthenate | 1 |
| "Freon 11" | 12 |
| "Irganox 1010" | 1 |
| "JPP 1100 D" | 3 |
| "Tinuvin 328" | 0.5 |
| "Sanol LS 744" | 0.5 |
| (NCO index: 110) | |

In the formulation above, the polyether polyol of 6 functionality has a terminal ethylene oxide adduct rate of 75% and an OH number of 34.5.

"Isophorone diisocyanate" is a trade name of 3-isocyanate methyl-3,5,5'-trimethylcyclohexyl isocyanate manufactured by VEBA CHEMIE AG. "Freon 11" is a trade name of monochlorotrifluoromethane manufactured by Daikin Company. "Irganox 1010" is a trade name of tetrakis[methylen-3-(3',5'-di-tertiary-butyl-4'-hydroxyphenyl)propionate] methane manufactured by Johoku Chemical Company and "JPP 1100 D" is a trade name of tetraalkyl-4,4'-isopropylidenediphenyl-diphosphite manufactured by said company. "Tinuvin 328" is 2-(2'-hydroxy-3',5'-di-tertiary-amylphenyl)-benzotriazole manufactured by Ciba Geigy. And "Sanol LS 744" is 4-benzoyloxy-2,2,6,6-tetramethyl-piperidine manufactured by Sankyo Company.

As a comparative example, another integral-skinned polyurethane foam was also prepared in a similar procedure to Example 1 except that polyether polyol of 3 functionality having a terminal ethylene oxide adduct rate of 80% and an OH number of 46 is used instead of that of 6 functionality and 34.5 parts by weight of isophorone diisocyanate is used.

EXAMPLE 2

The composition of under-mentioned formulation was reacted in the same procedure as Example 1 to prepare an integral-skinned polyurethane foam.

| Formulation | parts by weight |
|---|---|
| 6 Functionality polyether polyol | 60 |
| 3 Functionality polyether polyol | 40 |
| "Hylene W" | 40.9 |
| Diethanolamine | 8 |
| Lead naphthenate | 1 |
| "Freon 11" | 12 |
| "Irganox 1010" | 1 |
| "JPP 1100 D" | 3 |
| "Tinuvin 328" | 0.5 |
| "Sanol LS 744" | 0.5 |
| (NCO index: 105) | |

The polyol component consisting of the two has an average functionality of 4.1 and an average OH number of 39.1.

"Hylene W" is a trade name of 4,4'-methylenebis(cyclohexyl isocyanate) manufactured by Du Pont de Nemours.

The products of Example 1, Example 2 and Comparative Example were measured with respect to the physical properties in the table given below and the results are summarized in that table.

TABLE

| | Ex. 1 | Ex. 2 | Comp. Ex. |
|---|---|---|---|
| Heat Resistance: 80° C., 400 hr. (rating) | 5 | 5 | 5 |
| Heat Resistance: 120° C., 400 hr. (rating) | 3 | 3 | 2 |
| Weathering Resistance: WEATHER-O-METER 400 hr. (rating) | 4 | 4 | 3 |
| Weathering Resistance: Outdoor, 1 year (rating) | 4 | 4 | 4 |
| Apparent Density (g/cm$^3$) | 0.37 | 0.35 | 0.35 |
| Tensile Strength (kg/cm$^2$) | 1.9 | 2.0 | 1.8 |
| Tear Strength (kg/cm$^2$) | 1.2 | 1.3 | 1.2 |

The physical properties were examined as follows:

The heat resistance was evaluated by observing with the naked eye the samples (8 cm by 8 cm and 1.2 cm thick) after heated at 80° C. or 120° C. for 400 hours in a gear oven, with respect to the discoloration state on their surfaces and as to whether chalking due to the degradation occurs or not.

The weathering resistance was rated, on the one hand, by the observation with SUNSHINE WEATHER-O-METER (Atlas Co.) on which the samples were exposed to the black panel kept at 83°±3° C. for 400 hours under no rainy condition and then examined likewise in respect of the same items as above.

On the other hand, the samples placed in a glass box were leaned outdoors at an angle of 45° so as to face the south and there exposed for one year in order to rate likewise the weathering resistance.

In evaluating the heat resistance and weathering resistance, the data obtained were determined in terms of five graded ratings, according to which:

A sample surface change of which is not wholly visible is determined to be rating of 5;

A sample surface change of which is appreciably visible but imperceptible rating of 4;

A sample surface charge of which is slightly perceptible rating of 3;

A sample surface change of which is rather perceptible rating of 2; and

A sample surface change of which is conspicuous rating of 1.

The values of apparent density were obtained by dividing the weight of each sample having a size of 200 mm × 150 mm × 12 mm thick by the overall bulk inclusive of the cell.

The tensile strength and tear strength were measured according to JIS-K-6301.

While the invention has been described in detail and with reference to specific embodiments thereof, it will be apparent to one skilled in the art that various changes and modifications can be made therein without departing from the spirit and scope thereof.

What is claimed is:

1. A process for preparing an integral-skinned polyurethane foam of improved heat and weathering resistance wherein a foamable composition for formation of polyurethane which comprises one or more polyols, a polyisocyanate, a cross-linking agent, a catalyst, and a blowing agent is reacted and expanded in a mold, characterized in that (a) said one or more polyols are polyether polyols having a terminal ethylene oxide adduct rate of at least 60%, an OH number of 20 to 100 and an average functionality of 4 to 8, or one or more polyester polyols having a functionality of 4 to 8;

(b) said polyisocyanate is a non-aromatic polyisocyanate having an isocyanate index of 90 to 130;

(c) said cross-linking agent is diethanolamine and ranges from 0.5 to 20 parts by weight based on 100 parts by weight of said one or more polyols;

(d) said catalyst is an organometallic salt; and (e) said blowing agent is a halogenated hydrocarbon of a low boiling point.

2. The process for preparing an integral-skinned polyurethane foam as claimed in claim 1, wherein said foamable composition further comprises (f) anti-yellowing agent containing (f$_1$) anti-oxidant of a hindered phenol, (f$_2$) assistant antioxidant of a phosphite or thioether, (f$_3$) an ultraviolet absorber selected from benzotriazoles or benzophenones and (f$_4$) ultraviolet stabilizer of a hindered amine.

3. The process of claim 1, wherein said one or more polyols are polyether polyols.

4. The process of claim 1, wherein said one or more polyols are polyester polyols.

5. The process of claim 1, wherein said one or more polyols have an OH number of 30 to 50.

* * * * *

REEXAMINATION CERTIFICATE (258th)

United States Patent [19]

Yamamoto et al.

[11] B1 4,289,856

[45] Certificate Issued Oct. 2, 1984

[54] PROCESS FOR PREPARING NON-YELLOWING INTEGRAL-SKINNED POLYURETHANE FOAM USING A POLYOL HAVING A FUNCTIONALITY OF 4 TO 8

[75] Inventors: Masaki Yamamoto; Ichiro Azuma, both of Kakogawa, Japan

[73] Assignee: The Toyo Rubber Industry Co., Ltd., Osaka, Japan

Reexamination Request:
No. 90/000,464, Oct. 28, 1983

Reexamination Certificate for:
Patent No.: 4,289,856
Issued: Sep. 15, 1981
Appl. No.: 94,265
Filed: Nov. 14, 1979

[30] Foreign Application Priority Data

Nov. 14, 1978 [JP] Japan ................. 53-140577

[51] Int. Cl.$^3$ ............................................. C08G 18/14
[52] U.S. Cl. ........................................ 521/51; 521/107; 521/113; 521/117; 521/121; 521/124; 521/127; 521/128; 521/129; 521/167; 521/172; 521/173; 521/174; 521/176

[56] References Cited

U.S. PATENT DOCUMENTS

| | | | |
|---|---|---|---|
| 3,778,390 | 12/1973 | Ulrich, Jr. | 260/2.5 AN |
| 4,007,140 | 2/1977 | Ibbotson | 260/2.5 AC |
| 4,150,206 | 4/1979 | Jorquin et al. | 521/51 |

FOREIGN PATENT DOCUMENTS

918675 1/1973 Canada.
2354952 11/1973 Fed. Rep. of Germany.

*Primary Examiner*—Maurice J. Welsh

[57] ABSTRACT

A process for preparing an integral-skinned polyurethane foam wherein a foamable composition for formation of polyurethane which comprises a polyol, polyisocyanate, cross-linking agent, catalyst, and blowing agent is reacted and expanded in a mold, characterized in that (a) said polyol is a polyether polyol having a terminal ethylene oxide adduct rate of at least 60%, an OH number of 20 to 100 and a functionality of 4 to 8, or a polyester polyol having a functionality of 4 to 8;
(b) said polyisocyanate is a non-aromatic polyisocyanate having an isocyanate index of 90 to 130;
(c) said cross-linking agent is diethanolamine and ranges from 0.5 to 20 parts by weight based on 100 parts by weight of said polyol;
(d) said catalyst is an organometallic salt; and
(e) said blowing agent is a halogenated hydrocarbon of a low boiling point.

:REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-5 is confirmed.

* * * * *